United States Patent [19]
Datz-Siegel et al.

[11] Patent Number: 5,861,453
[45] Date of Patent: Jan. 19, 1999

[54] SILICONE COMPOSITIONS AND USES THEREOF

[75] Inventors: Teresa Lynn Datz-Siegel; Kenneth Christopher Fey, both of Midland, Mich.; Jacqueline L'Hostis, Hellebecq; Franck A Renauld, Chaumont-Gistoux, both of Belgium

[73] Assignees: Dow Corning Corporation, Midland, Mich.; Dow Corning S.A., Seneffe, Belgium

[21] Appl. No.: 789,143

[22] Filed: Jan. 28, 1997

Related U.S. Application Data

[63] Continuation-in-part of Ser. No. 635,347, Apr. 19, 1996, abandoned.

[51] Int. Cl.$^6$ .................................................. B01D 19/04
[52] U.S. Cl. ........................ 524/491; 524/501; 524/588; 524/491; 524/493; 524/863; 524/847; 524/848; 252/321; 252/358
[58] Field of Search .................................... 524/501, 588, 524/491, 493, 863, 847, 848; 252/321, 358

[56] References Cited

U.S. PATENT DOCUMENTS

| | | | |
|---|---|---|---|
| 3,666,681 | 5/1972 | Keil | 252/358 |
| 4,564,467 | 1/1986 | Rauline | 252/573 |
| 4,639,489 | 1/1987 | Aiwaza et al. | 524/588 |
| 4,690,713 | 9/1987 | Terae et al. | 106/287.16 |
| 4,749,740 | 6/1988 | Aizawa et al. | 524/588 |
| 4,978,471 | 12/1990 | Starch | 252/174.15 |
| 4,983,316 | 1/1991 | Starch | 252/174.15 |
| 5,283,004 | 2/1994 | Miura | 252/358 |

FOREIGN PATENT DOCUMENTS

| | | | |
|---|---|---|---|
| 0217501 | 7/1986 | European Pat. Off. | B01D 19/04 |
| 1224026 | 3/1968 | United Kingdom | C08G 47/02 |
| 1496011 | 2/1975 | United Kingdom | C08L 83/04 |

*Primary Examiner*—Margaret W. Glass
*Attorney, Agent, or Firm*—Timothy J. Troy

[57] ABSTRACT

The present invention relates to a silicone composition prepared by reacting a mixture comprising (i) mineral oil, (ii) a polyorganosiloxane, (iii) a silicon compound, and (iv) a catalytic amount of a catalyst. The compositions of this invention are resistant to phase separation and are useful as foam control compositions in foam producing systems.

20 Claims, No Drawings

SILICONE COMPOSITIONS AND USES THEREOF

This application is a continuation-in-part of application Ser. No. 08/635,347 filed on Apr. 19, 1996 abandoned.

BACKGROUND OF THE INVENTION

This invention relates to novel silicone compositions and to uses of these compositions. More particularly, this invention relates to a silicone composition prepared by reacting a mixture comprising mineral oil, a polyorganosiloxane, a silicon compound, and a catalytic amount of a catalyst.

Silicone compositions which are prepared by a reaction of several components have been disclosed. For example, Aizawa et al., in U.S. Pat. Nos. 4,639,489 and 4,749,740, teach a method for producing a silicone defoamer composition wherein a complex mixture of polyorganosiloxanes, filler, a resinous siloxane and a catalyst to promote reaction of the other components are heated together at 50° C. to 300° C.

More recently, a method for preparing a composition similar to that described by Aizawa et al., cited supra, was disclosed by Miura in U.S. Pat. No. 5,283,004. In this disclosure, the above mentioned complex silicone mixture additionally contains at least 0.2 weight parts of an organic compound having at least one group selected from —COR, —COOR' or —(OR")$_n$—, wherein R and R' are hydrogen or a monovalent hydrocarbon group, R" is a divalent hydrocarbon group having 2 to 6 carbon atoms and the average value of n is greater than one. It is further disclosed that all the ingredients, including a catalyst, must be reacted at elevated temperatures to obtain the desired antifoam agent.

John et al., in European Patent Application No. 217,501, published Apr. 8, 1987, discloses a foam control composition which gives improved performance in high foaming detergent compositions which comprises (A) a liquid siloxane having a viscosity at 25° C. of at least $7 \times 10^{-3}$ m$^2$/s and which was obtained by mixing and heating a triorganosiloxane-endblocked polydiorganosiloxane, a polydiorganosiloxane having at least one terminal silanol group and an organosiloxane resin, comprising monovalent and tetravalent siloxy units and having at least one silanol group per molecule, and (B) a finely divided filler having its surface made hydrophobic. John et al. further describes a method for making the foam control compositions and detergent compositions containing said foam control compositions.

Starch, in U.S. Pat. No. 4,983,316 discloses a dispersible antifoam composition for providing controlled foaming liquid laundry detergent formulations and wherein there is provided a non-aqueous emulsion of primary and secondary silicone antifoam agents, at least one nonionic silicone surfactant for emulsifying the primary and secondary antifoaming agents in a solvent, a first organic surfactant dispersing agent for assisting in dispersing the emulsified primary and secondary antifoaming agents in the liquid laundry detergents, and a second dispersing agent of a nonionic difunctional block-copolymer terminating in primary hydroxyl groups for further assisting in dispersing the emulsified primary and secondary antifoam agents in the liquid laundry detergent. A liquid laundry detergent composition containing the composition described immediately above is also disclosed. Starch, in U.S. Pat. No. 4,978,471 discloses a composition which contains essentially the same components as in the '316 patent, however in the '471 patent the secondary antifoam agent is a blend of a polydimethylsiloxane substituted with polar groups and a polydimethylsiloxane fluid.

Terae et al., in U.S. Pat. No. 4,690,713, discloses an antifoam composition comprising (a) 100 parts by weight of a hydrocarbon oil, such as a spindle oil or silicone fluid (e.g. a polydimethylsiloxane fluid having a viscosity of 20 to 1,000,000 centistokes at 25° C., (b) 0.1 to 40 parts by weight of an organosilane compound having 1 to 3 hydroxy groups or hydrolyzable groups (such as alkoxy, acyloxy, and alkenyloxy groups), (c) 1 to 40 parts by weight of a finely divided silica powder and optionally a catalyst.

Silicone compositions which contain mineral oil have also been disclosed. For example, in Great Britain Patent Specification No. 1224026 is disclosed a process for inhibiting or destroying foam in an aqueous system which comprises adding to the aqueous system an antifoaming agent which is composed of (A) 10 parts by weight of a water insoluble organic liquid which can be a mineral oil and (B) from 0.1 to 5.0 parts by weight of an organopolysiloxane which is compatible in (A) consisting essentially of (1) SiO$_2$ units and (2) R$_3$SiO$_{1/2}$ units in which R is a monovalent hydrocarbon radical containing from 1 to 6 inclusive carbon atoms, and in which the ratio of (1) units to (2) units is within the range from 0.6/1 to 1.2/1.

Keil, in U.S. Pat. No. 3,666,681 discloses an antifoaming agent for aqueous systems consisting essentially of a mixture of (A) 100 parts by weight of a water insoluble organic liquid or solid which can be a mineral oil, (B) from 0.5 to 10 parts by weight of an organopolysiloxane compound selected from the group consisting of a hydroxyl terminated dimethylpolysiloxane fluid having a viscosity of at least 35 centistokes at 25° C. and a benzene soluble organopolysiloxane resin comprising (1) R$_3$SiO$_{1/2}$ units and (2) SiO$_2$ units in which R is a monovalent hydrocarbon radical containing from 1 to 6 carbon atoms inclusive, and in which the ratio of (1) units to (2) units is from 0.6:1 to 1.2:1, (C) /from 0.5 to 10 parts by weight of a filler such as finely divided silica, (D) from 0.002 to 5 parts by weight of a compound which is a hydrocarbon amine, ammonia, a disilazane, or a compound of the formula R'OH in which R' is an alkali of alkaline earth metal.

Great Britain Patent Specification No. 1496011 discloses a composition suitable for use in an oil-based defoamer consisting essentially of (1) from 55 to 96 percent by weight of a siloxane having the unit formula CH$_3$Si(OCH$_3$)$_x$O$_{3-x/2}$ in which x is such that there is from 10 to 35 percent by weight of methoxy groups based on the weight of (1), (2) from 2 to 25 percent by weight of a hydrocarbon solvent soluble copolymer of (CH$_3$)$_3$SiO$_{1/2}$ units and SiO$_2$ units in which the ratio of (CH$_3$)$_3$SiO$_{1/2}$ units to SiO$_2$ units is in the range of 0.5/1 to 1.2/1, and (3) from 2 to 25 percent by weight of a silicon-bonded hydroxyl terminated methylpolysiloxane fluid. This reference further discloses a defoaming composition for aqueous systems comprising a composition prepared by mixing (A) 100 parts by weight of a mineral oil, (B) 3 to 20 parts by weight of the above composition, and (C) a condensation catalyst for (B), and thereafter heating the mixture at a temperature of at least 50° C. until an effective defoamer is obtained.

Rauline in U.S. Pat. No. 4,564,467 discloses an oil composition comprising an oil having a kinematic viscosity of 5 to 30 centistokes at 25° C., and a long-chain alkyl organosiloxane.

SUMMARY OF THE INVENTION

It has now been discovered that mineral oils are useful in making silicone compositions.

It is an object of the present invention to prepare silicone compositions which can be advantageously utilized in a variety of applications including foam producing systems.

It is a further object of the present invention to provide silicone compositions wherein there is provided improvement in the control of foaming behavior.

It is another object of this invention to provide a silicone composition which is stable, resistant to phase separation, and is easily dispersible into a variety of media.

DETAILED DESCRIPTION OF THE INVENTION

The present invention relates to a silicone composition prepared by reacting at a temperature of 20° C. to 300° C. a mixture comprising: (i) 1 to 100 parts by weight of mineral oil; (ii) 5 to 100 parts by weight of a polyorganosiloxane having a viscosity of 200 to about 100 million mm$^2$/s at 25° C. expressed by the general formula $R^2{}_b(R^3O)_c\text{Sio}_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain; (iii) 0.1 to 20 parts by weight of at least one silicon compound selected from (a) an organosilicon compound of the general formula $R^4{}_d\text{SiX}_{4-d}$ in which $R^4$ is a monovalent hydrocarbon group having 1 to 5 carbon atoms, X is selected from a halogen atom or a hydrolyzable group and d has an average value of one or less, (b) a partially hydrolyzed condensate of said compound (a), (c) a siloxane resin comprising $(CH_3)_3SiO_{1/2}$ units and $SiO_{4/2}$ units wherein the ratio of $(CH_3)_3\text{Sio}_{1/2}$ units to $SiO_{4/2}$ units is 0.4:1 to 1.2:1, or (d) a condensate of said compound (c) with said compound (a) or (b); and (iv) a catalytic amount of a catalyst.

The silicone compositions of this invention are prepared by reacting a mixture of (i) mineral oil, (ii) a polyorganosiloxane, (iii) a silicon compound, and (iv) a catalyst.

Component (i) is mineral oil. The term "mineral oil" as used herein refers to hydrocarbon oils derived from carbonaceous sources, such as petroleum, shale, and coal, and equivalents thereof. The mineral oil of component (i) can be any type of mineral oil or mineral spirits, many of which are commercially available, including heavy white mineral oil which is high in paraffin content, light white mineral oil, petroleum oils such as aliphatic or wax-base oils, aromatic or asphalt-base oils, or mixed base oils, petroleum derived oils such as petroleum spirits, ligroin, lubricants, engine oils, machine oils, or cutting oils, and medicinal oils such as refined paraffin oil. The above mentioned mineral oils are available commercially at a variety of viscosities from Amoco Chemical Company (Chicago, ILL.) under the tradename Amoco White Mineral Oil, from Exxon Company (Houston, Tex.) under the tradenames Bayol™, Marcol™, or Primol™, or from Lyondell Petrochemical Company (Houston, Tex.) under the trade name Duoprime® Oil, or from Exxon under the tradename Varsol 60. Preferably the mineral oil has a viscosity of from about 5 to about 20 millipascal-seconds at 25° C.

Component (ii) is a polyorganosiloxane comprising siloxane units of the general formula $R^1{}_{a(R}{}^2O)_b\text{Sio}_{(4-a-b)/2}$ and having a viscosity of 200 to 100 million centistokes at 25° C. wherein $R^1$ is independently selected from the monovalent hydrocarbon or halogenated hydrocarbon groups having from 1 to 10 carbon atoms, $R^2$ is a hydrogen atom or $R^1$, and the —$OR^2$ group is present at least at the end of a molecular chain of the polyorganosiloxane. The value of a is between 1.9 to 2.2 and b has a value so as to provide at least one —$OR^2$ group per molecule. It is particularly preferred that polyorganosiloxane (ii) is a hydroxyl-terminated polydimethylsiloxane having a viscosity of about 1,000 to 50,000 mm$^2$/s at 25° C.

Component (iii) is at least one silicon compound selected from (a) to (d): (a) an organosilicon compound of the general formula $R^3{}_c\text{SiX}_{4-c}$ wherein $R^3$ is a monovalent hydrocarbon group having one to five carbon atoms, X is a halogen atom or a hydrolyzable group, such as —$OR^4$ or —$OR^5OR^6$, in which $R^5$ is a divalent hydrocarbon group having one to five carbon atoms and $R^4$ and $R^6$ are each selected from a hydrogen atom or a monovalent hydrocarbon group having one to five carbon atoms, the average value of c not exceeding 1, (b) a partially hydrolyzed condensate of the compound (a), (c) a siloxane resin comprising $(CH_3)_3SiO1/_2$ and $SiO_2$ units and having a $(CH_3)_3\text{SiO}_{1/2}/\text{SiO}_2$ ratio of 0.4/1 to 1.2/1, or (d) a condensate of the siloxane resin (c) with the compound (a) or (b). It is preferred that component (iii) is selected from either an alkyl polysilicate wherein the alkyl group has one to five carbon atoms, such as methyl polysilicate, ethyl polysilicate and propyl polysilicate, or the siloxane resin (c). Most preferably, component (iii) is either ethyl polysilicate or a siloxane resin copolymer comprising $(CH_3)_3SiO_{1/2}$ units and $SiO_2$ units in a molar ratio of approximately 0.4:1 to 1.2:1.

Component (iv) is a catalyst. Any compound which promotes condensation reactions or rearrangement/condensation reactions are suitable as component (iv). It is preferably selected from siloxane equilibration catalysts, silanol-condensing catalysts, or a combination thereof. Catalysts suitable as component (iv) are exemplified by alkali metal hydroxides such as potassium hydroxide, sodium hydroxide, or cesium hydroxide, alkali metal silanolates such as potassium silanolate, alkali metal alkoxides such as potassium isopropoxide or potassium ethoxide, quaternary ammonium hydroxides such as beta-hydroxyethyltrimethyl ammonium hydroxide, benzyltrimethyl ammonium hydroxide, and tetramethyl ammonium hydroxide, quaternary ammonium silanolates, quaternary phosphonium hydroxides such as tetrabutyl phosphonium hydroxide and tetraethylphosphonium hydroxide, quaternary phosphonium silanolates, metal salts of organic acids such as dibutyltin dilaurate, stannous acetate, stannous octanoate, lead napthenate, zinc octanoate, iron 2-ethylhexoate, and cobalt naphthenate, mineral acids such as sulfuric or hydrochloric acid, organic acids such as acetic acid or organosulfonic acids, and ammonium compounds such as ammonium carbonate or ammonium hydroxide. It is preferred that the catalyst is selected from potassium silanolate, potassium hydroxide, or sodium hydroxide.

The mixture can further comprise up to 30 parts by weight of component (v) a finely divided filler. The finely divided filler is exemplified by fumed, precipitated, or plasmatic $TiO_2$, $Al_2O_3$, $Al_2O_3/SiO_2$, $ZrO_2/SiO_2$, and $SiO_2$. The finely divided filler can be hydrophilic or hydrophobic. The filler can be hydrophobed during manufacture (i.e. in-situ) or independently. Various grades of silica having a particle size of several millimicrons to several microns and a specific surface area of about 50 to 1000 m$^2$/g are commercially available and suitable for use as component (v).

The mixture can further comprise up to 20 parts by weight of component (vi), a polyorganosiloxane comprising siloxane units of the general formula $R^7{}_d(R^8O)_e\text{SiO}_{(4-d-e)/2}$ and having a viscosity of 5 to 200 mm$^2$/s at 25° C. wherein $R^7$ is a monovalent hydrocarbon or halogenated hydrocarbon group having one to ten carbon atoms and $R^8$ is hydrogen or a monovalent hydrocarbon group having one to ten carbon atoms. The value of d is between 1.9 and 2.2 and e has a value so as to provide two or more —OR8 groups in each molecule. It is particularly preferred that component (vi) is a hydroxyl-terminated polydimethylsiloxane having a viscosity of about 10 to 100 mm$^2$/s at 25° C. It is preferred that component (vi) is added when filler (v) is a hydrophilic silica.

A mixture of components (i), (ii), (iii), and (iv), and optionally components (v) and/or (vi), is reacted at room temperature or under heat to produce the silicone compositions of this invention, the proportions of the various components being: Component (i)—1 to 100 parts by weight, preferably 40–70 parts by weight; Component (ii)—5 to 100 parts by weight; Component (iii)—0.1 to 20, preferably 1 to 7, parts by weight; Component (iv)—A catalytic amount (usually in the range of 0.03 to 1 part by weight); Component (v), if present,—up to 30, preferably 1 to 15, and highly preferred is 5 to 15 parts by weight; Component (vi), if present,—up to 20, preferably 1 to 10, parts by weight.

The silicone compositions of this invention are prepared by simply mixing components (i), (ii), (iii), and (iv), and any optional components at room temperature (about 20° to 25° C.) or heating this blend to about 110° to 120° C. Finely divided filler (v), if desired, is then uniformly mixed in using an appropriate dispersing device, such as a homomixer, colloid mill or triple roll mill. The resulting mixture, if heated, is heated to a temperature of 50° C. to 300° C., preferably 100° C. to 300° C., and reacted for one to eight hours, although the reaction time varies depending on the temperature. If component (vi) is to be employed in the composition, it is generally added after the filler (v). It is preferable to carry out all mixing and heating operations in an inert gas atmosphere in order to avoid any danger and to remove volatile matter (unreacted matter, by-products, etc.). The mixing order of the components and the heating temperature and time as hereinabove stated are not believed critical, but can be changed as required. It is further preferred that, after reaction, the catalyst is neutralized to further stabilize the composition. Examples of the neutralization component are dry ice with calcium carbonate, or acetic acid with water.

Alternatively, the composition preferably comprises mineral oil, a polyorganosiloxane, a silicon compound, and a catalyst, this combination optionally containing a filler such as silica.

A highly preferred silicone composition is a homogeneous blend of a hydroxyl-terminated polydimethylsiloxane, a mineral oil having a viscosity of 5 to 20 millipascal-seconds at 25° C., an alkyl polysilicate wherein the alkyl group has one to five carbon atoms, such as methyl polysilicate, ethyl polysilicate or propyl polysilicate, and a potassium silanolate or potassium hydroxide catalyst reacted at a temperature of 25° to 300° C.

The silicone composition of this invention may be used as it is, or in the form of a solution obtained by a dispersion in an appropriate solvent or an emulsion obtained by a known emulsifying method.

The present invention also relates to a process for controlling foam in a foaming system wherein the above-described silicone compositions may simply be added to the foaming or foam-producing system, in an amount sufficient to reduce foaming, as determined by routine experimentation. Typically, the compositions of the present invention are added at a concentration of about 0.001 to 0.1 parts by weight based on the weight of the foaming system, however the skilled artisan will readily determine optimum concentrations after a few routine experiments. The method of addition is not critical, and the composition may be metered in or added by any of the techniques known in the art. Examples of foaming systems contemplated herein include media encountered in the production of phosphoric acid and in sulphite or sulphate process pulping operations, bauxite digestion medium in the production of aluminum, metal working fluids, paper manufacture, detergent systems, hydrocarbon based systems, oil extraction, etc. The compositions of the present invention can be used as any kind of foam control composition, i.e. as defoaming compositions and/or antifoaming compositions. Defoaming compositions are generally considered as foam reducers whereas antifoaming compositions are generally considered as foam preventors. The compositions of the present invention find utility as foam control compositions in various media such as inks, coatings, paints, detergents, pulp and paper manufacture, textile dyes, and hydrocarbon-containing fluids. The compositions of this invention also find utility in gas-oil separation and petroleum processing.

EXAMPLES

All parts and percentages in the examples are on a weight basis unless indicated to the contrary. All viscosities were measured on a Brookfield Viscometer. The following materials were employed in the preparation of the silicone compositions:

Mineral Oil A is Duoprime® Oil 55, a white mineral oil having a viscosity of about 10 millipascal-seconds at 25° C. from Lyondell Petrochemical Company (Houston, Tex.).

Mineral Oil B is Duoprime® Oil 90, a white mineral oil having a viscosity of about 23 millipascal-seconds at 25° C. from Lyondell Petrochemical Company (Houston, Tex.).

Example 1

Into a 500 cc. glass reactor equipped with an electric stirrer and a nitrogen blanket was loaded 55 parts of Mineral Oil B, 39 parts of a hydroxy end-blocked polydimethylsiloxane having a viscosity of 12,500 millipascal-seconds, and 5.9 parts of polyethyl silicate. These were mixed until homogeneous. The mixture was then catalyzed with ethanolic KOH (to total 20 ppm K+) and the resulting reaction was allowed to run for 30 hours. The reaction product was then neutralized with a combination of calcium carbonate and dry ice even though there was no direct evidence of viscosity increase.

The reaction product was a cloudy, lumpy liquid which under microscopic evaluation was found to be a fine emulsion of two discrete phases. Less than 1 week after manufacture, this finished material was observed to have completely separated into two separate liquid phases.

Example 2

Into a 500 cc. glass reactor equipped with an electric stirrer and a nitrogen blanket was loaded 55 parts of Mineral Oil A, 39 parts of a hydroxy end-blocked polydimethylsiloxane having a viscosity of 12,500 millipascal-seconds, and 5.9 parts of polyethyl silicate. These were mixed until homogeneous. The mixture was then catalyzed with ethanolic KOH (to total 20 ppm K+) and the resulting reaction was allowed to run until evidence of viscosity increase was observed. The reaction product was then neutralized with a combination of calcium carbonate and dry ice.

The reaction product was a slightly hazy (due to the calcium carbonate), and was a homogeneous liquid. This material remained stable at room temperature for over 1 week.

Example 3

Shake testing of the composition prepared in Example 2 was carried out using a Triton™ X-100 surfactant solution. the concentration of the surfactant in water is 1% by weight.

The silicone composition from Example 2 was prepared as an aqueous emulsion prior to shake testing. To a 250 ml stainless steel beaker was added 120.16 grams of an aqueous mixture (which contained 3.60 grams of Pegosperse® 1500 (a combination of polyethylene glycol esters of $C_{14}$–$C_{18}$ fatty acids from Lonza, Fairlawn, N.J.) and 9.13 grams of Lonzest® GMS Technical (hydrogenated mono-, di-, and tri- $C_{16}$–$C_{18}$ fatty acid glycerides from Lonza, Fairlawn, N.J.) dispersed in 107.06 grams of water). At 500 RPM using a marine blade agitator, 13.35 grams of the silicone composition prepared in Example 2 was added to the aqueous mixture over a period of 2 minutes. This composition was mixed at 500 RPM for a total of 30 minutes additional time.

The shake test involves 100 grams of a 1 weight percent solution of Triton™ X-100 (TRITON™ X-100 is octylphenoxy polyethoxy ethanol having an HLB of 13.5 from Rohm and Haas Company, Philadelphia, Pa.) and a measured amount of the antifoam composition, in this case the aqueous emulsion described above. The test is run at 25° C. Five shakes of the test sample are run in succession lasting 10 seconds, 40 seconds, 60 seconds, 120 seconds and 600 seconds. After each period of shaking, the time for the foam to collapse to 0.5 cm above the original liquid level of the test solution is recorded. The time it takes for a clear area of the liquid surface, free of bubbles, to appear is also recorded (break time). A blank test run in which no silicone composition of the invention was added to the Triton™ X-100 solution was also subjected to the same shake test. The results are shown in Tables 1 and 2 below.

TABLE 1

| | COLLAPSE TIME (sec.) | | | | |
|---|---|---|---|---|---|
| Composition | 10 | 40 | 60 | 120 | 600 |
| Example 3 | 37 | 42 | 36 | 39 | 43 |
| Blank | >120 | >120 | >120 | >120 | >120 |

TABLE 2

| | BREAK TIME (sec.) | | | | |
|---|---|---|---|---|---|
| Composition | 10 | 40 | 60 | 120 | 600 |
| Example 3 | 85 | 80 | 70 | 95 | 85 |
| Blank | >120 | >120 | >120 | >120 | >120 |

Example 4

Into a 500 cc glass reactor equipped with an electric stirrer and a nitrogen blanket was loaded 76 parts of mineral spirit, 24 parts of a hydroxy end-blocked polydimethylsiloxane having a viscosity of 12,500 millipascal-seconds, and progressively 0.2 parts of polyethyl silicate. These were mixed until homogeneous. The mixture was then catalyzed with 0.35 parts NaOH and the resulting reaction was allowed to run for about 2 hours. The reaction product was then neutralized with a combination of 0.1 parts of acetic acid and 0.05 parts of water until the viscosity reached about 300 mm$^2$/s. The reaction product was a cloudy, gel-like product. The finished material was observed to be stable during 6 months storage.

Example 5

A foaming test of the composition prepared in Example 4 was carried out using 90 ml of crude oil from the Sullum Voe terminal doped with 10 ml of n-hexane and was poured into an air-inlet tube, to the bottom of which is fastened a gas diffuser. The gas diffuser was a 25.4 mm diameter spherical gas diffuser stone made of fused crystalline alumina grain. The air inlet tube just touches the bottom of the cylinder and is approximately at the center of the circular cross section.

The composition prepared in Example 4 at a dilution level of 1% active material was added at the surface of the crude oil mixture. The test was carried out at an air flow rate of 30 liters per hour. The foam volume percentage was recorded versus time during 2 minutes. The results are shown in Table 3 below for the composition prepared in Example 4 (denoted A) and are compared to a comparative foaming test (reference, denoted Ref.) carried out in the same conditions but without the composition according to the invention.

TABLE 3

| % foam/ time | 10 seconds | 20 seconds | 30 seconds | 40 seconds | 60 seconds | 120 seconds |
|---|---|---|---|---|---|---|
| A | 35 | 60 | 70 | 60 | 50 | 30 |
| Ref. | 120 | * | * | * | * | * |

\* - signifies overfoaming

That which is claimed is:

1. A silicone composition prepared by reacting at a temperature of 20° C. to 300° C. a mixture comprising:
   (i) 1 to 100 parts by weight of a hydrocarbon oil having a viscosity of 5 to 20 millipascal-seconds at 25° C.;
   (ii) 5 to 100 parts by weight of a polyorganosiloxane having a viscosity of 200 to about 100 million mm$^2$/s at 25° C. expressed by the general formula $R^1_a(R^2O)_bSiO_{(4-a-b)/2}$ in which R' is a monovalent hydrocarbon or halogenated hydrocarbon group having 1 to 10 carbon atoms, $R^2$ is hydrogen or a monovalent hydrocarbon group having 1 to 10 carbon atoms, a has an average value of 1.9 to 2.2 and b has a sufficiently large value to give at least one —OR$^2$ group in each molecule, at least one such —OR$^2$ group being present at the end of the molecular chain;
   (iii) 0.1 to 20 parts by weight of at least one silicon compound selected from
      (a) an organosilicon compound of the general formula $R^3_cSiX_{4-c}$ in which $R^3$ is a monovalent hydrocarbon group having 1 to 5 carbon atoms, X is selected from a halogen atom or a hydrolyzable group and c has an average value of one or less,
      (b) a partially hydrolyzed condensate of said compound (a),
      (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, or
      (d) a condensate of said compound (c) with said compound (a) or (b); and
   (iv) a catalytic amount of a catalyst.

2. A composition according to claim 1, wherein polyorganosiloxane (ii) is a hydroxyl-terminated polydimethylsiloxane having a viscosity of about 1,000 to 50,000 mm$^2$/s at 25° C.

3. A composition according to claim 1, wherein silicon compound (iii) is selected from ethyl polysilicate or a siloxane resin copolymer comprising $(CH_3)_3SiO_{1/2}$ units and $SiO_2$ units in a molar ratio of approximately 0.4:1 to 1.2:1, respectively.

4. A composition according to claim 1, wherein the catalyst (iv) is selected from alkali metal hydroxides, alkali metal silanolates, alkali metal alkoxides, quaternary ammonium hydroxides, quaternary ammonium silanolates, quaternary phosphonium hydroxides, quaternary phosphonium silanolates, ammonium carbonate, or metal salts of organic acids.

5. A composition according to claim 1, wherein the mixture further comprises up to 30 parts by weight of: (v) at least one finely divided filler.

6. A composition according to claim 5, wherein the finely divided filler (v) is a hydrophobic silica having a surface area of about 50 to 300 $m^2/g$.

7. A composition according to claim 5, wherein the mixture further comprises up to 20 parts by weight of: (vi) a polyorganosiloxane having a viscosity of 5 to 200 $mm^2/s$ at 25° C. and being expressed by the general formula $R^7_d(R^8O)_e SiO_{(4-d-e)/2}$ wherein $R^7$ is a monovalent hydrocarbon or halogenated hydrocarbon group having one to ten carbon atoms, $R^8$ is hydrogen or a monovalent hydrocarbon group having one to ten carbon atoms, d is has a value of 1.9 and 2.2 and e has a value so as to provide at least two —$OR^8$ groups in each molecule.

8. A composition according to claim 7, wherein said polyorganosiloxane (vi) is a hydroxyl-terminated polydimethylsiloxane having a viscosity of about 10 to 100 $mm^2/s$ at 25° C.

9. A composition according to claim 1, wherein the mixture further comprises up to 20 parts by weight of: (vi) a polyorganosiloxane having a viscosity of 5 to 200 $mm^2/s$ at 25° C. and being expressed by the general formula $R^7_d(R^8O)_e SiO_{(4-d-e)-/2}$ wherein $R^7$ is a monovalent hydrocarbon or halogenated hydrocarbon group having one to ten carbon atoms, $R^8$ is hydrogen or a monovalent hydrocarbon group having one to ten carbon atoms, d is has a value of 1.9 and 2.2 and e has a value so as to provide at least two —$OR^8$ groups in each molecule.

10. A composition according to claim 9, wherein said polyorganosiloxane (vi) is a hydroxyl-terminated polydimethylsiloxane having a viscosity of about 10 to 100 $mm^2/s$ at 25° C.

11. A method for controlling foam in a foam producing system comprising adding to the foam producing system the composition of claim 1.

12. A method for controlling foam in a foam producing system comprising adding to the foam producing system the composition of claim 4.

13. A method for controlling foam in a foam producing system comprising adding to the foam producing system the composition of claim 5.

14. A method for controlling foam in a foam producing system comprising adding to the foam producing system the composition of claim 9.

15. A method for controlling foam in a foam producing system comprising adding to the foam producing system the composition of claim 7.

16. A method according to claim 11, wherein the foam producing system is selected from inks, coatings, paints, detergents, pulp manufacture, paper manufacture, textile dyes, hydrocarbon containing fluids, gas-oil separation, or petroleum processing.

17. A method according to claim 13, wherein the foam producing system is selected from inks, coatings, paints, detergents, pulp manufacture, paper manufacture, textile dyes, hydrocarbon containing fluids, gas-oil separation, or petroleum processing.

18. A composition according to claim 1, wherein the hydrocarbon oil is selected from the group consisting of mineral oils, mineral spirits, petroleum oils, aromatic oils, asphalt-base oils, mixed base oils, petroleum derived oils, and medicinal oils.

19. A composition according to claim 18, wherein the petroleum oils are selected from the group consisting of aliphatic oils and wax-base oils, the petroleum derived oils are selected from the group consisting of petroleum spirits, ligroin, lubricants, engine oils, machine oils, and cutting oils, and the medicinal oil is a refined paraffin oil.

20. A method for controlling foam in a foam producing system-comprising adding to the foam producing system the composition of claim 18.

* * * * *